(12) United States Patent
Southey et al.

(10) Patent No.: US 10,315,582 B2
(45) Date of Patent: Jun. 11, 2019

(54) MOTOR VEHICLE AND A MULTI-FUNCTIONAL COVER FOR SAME

(71) Applicant: Ford Global Technologies, LLC, Dearborn, MI (US)

(72) Inventors: Bruce Southey, Farnham (GB); Richard Craven, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 100 days.

(21) Appl. No.: 15/604,813

(22) Filed: May 25, 2017

(65) Prior Publication Data

US 2017/0341588 A1 Nov. 30, 2017

(30) Foreign Application Priority Data

May 25, 2016 (GB) .................................... 1609217.3

(51) Int. Cl.
| | |
|---|---|
| *B60R 5/04* | (2006.01) |
| *B60J 5/10* | (2006.01) |
| *B60J 11/04* | (2006.01) |
| *B60N 2/30* | (2006.01) |
| *B60R 13/01* | (2006.01) |
| *B60N 2/36* | (2006.01) |

(52) U.S. Cl.
CPC ............... *B60R 5/047* (2013.01); *B60J 5/107* (2013.01); *B60J 11/04* (2013.01); *B60N 2/3011* (2013.01); *B60N 2/36* (2013.01); *B60R 5/045* (2013.01); *B60R 13/011* (2013.01); *B60R 5/048* (2013.01); *B60R 2013/016* (2013.01)

(58) Field of Classification Search
CPC ....... B60R 21/06; B60R 21/026; B60R 5/047; B60R 5/04; B60R 5/045; B60R 5/044; B60R 2021/065; B60R 7/005; B60N 2/305; B60N 2/3011; B60N 2/36; B60N 2/2013; B60N 2/2031; B60N 2/22; B60N 2/773; B60N 2/793; B60J 5/00; B60J 5/047; B60J 5/0479; B60J 5/0491; B60J 5/0497; B60J 5/104; B60J 5/12; B60J 7/02

USPC ......... 296/24.43, 37.16, 65.09, 186.4, 24.33, 296/24.4, 98, 69; 280/749, 748, 756, 280/782, 783; 49/339, 344, 345

See application file for complete search history.

(56) References Cited

U.S. PATENT DOCUMENTS

| | | | |
|---|---|---|---|
| 4,168,094 A | 9/1979 | Yagi | |
| 4,220,367 A * | 9/1980 | Gale | ................. B60R 5/047 160/323.1 |
| 4,776,625 A * | 10/1988 | Lobanoff | ................. B60R 5/045 296/37.16 |

(Continued)

FOREIGN PATENT DOCUMENTS

| | | |
|---|---|---|
| DE | 2624947 A1 | 12/1977 |
| DE | 4112737 C1 | 7/1992 |

(Continued)

*Primary Examiner* — D Glenn Dayoan
*Assistant Examiner* — Sunsurraye Westbrook
(74) *Attorney, Agent, or Firm* — Vichit Chea; Price Heneveld LLP

(57) ABSTRACT

A motor vehicle is disclosed having a flexible cover that is multi-functional in nature and can be configured as a cover for a rear luggage compartment of the motor vehicle as a small item carrier, as an extendible weather protector and as a roof protector for the motor vehicle.

13 Claims, 15 Drawing Sheets

(56) References Cited

U.S. PATENT DOCUMENTS

| | | | |
|---|---|---|---|
| 7,815,235 B2 * | 10/2010 | Hayashi | B60R 5/047 160/DIG. 2 |
| 2009/0096241 A1 * | 4/2009 | Miyajima | B60J 7/061 296/37.16 |
| 2016/0023610 A1 * | 1/2016 | Valencia Cruz | B60R 5/045 296/37.16 |

FOREIGN PATENT DOCUMENTS

| | | |
|---|---|---|
| DE | 102008017202 A1 | 10/2009 |
| JP | 2000038089 A | 2/2000 |

* cited by examiner

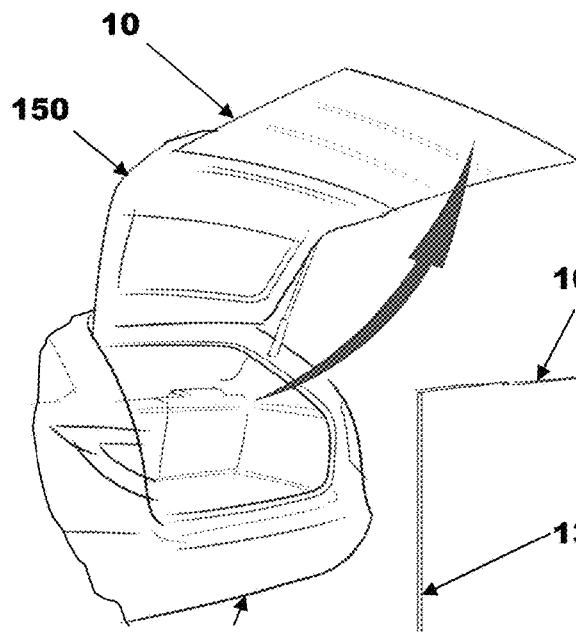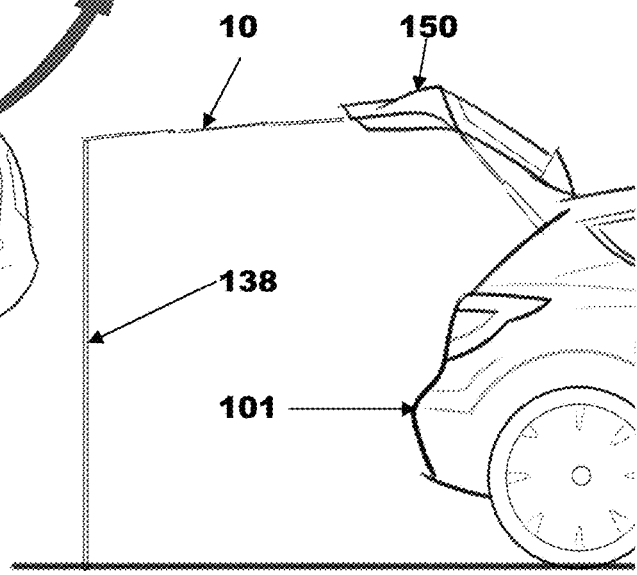
Fig.15a  Fig.15b
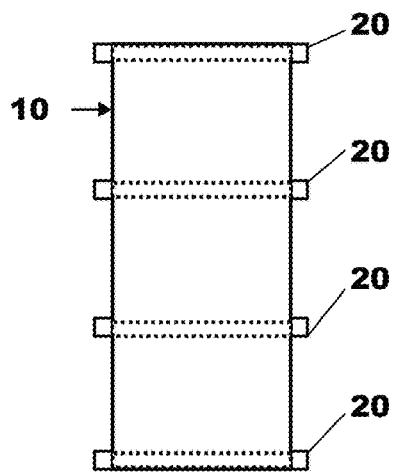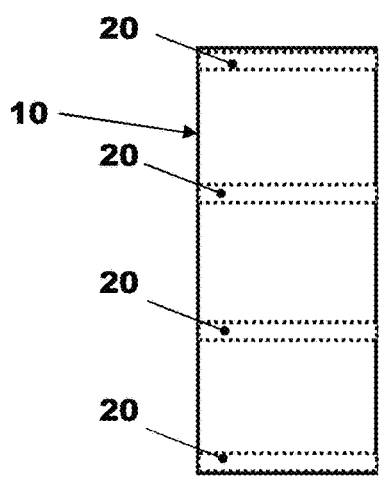
Fig.17  Fig.18

MOTOR VEHICLE AND A MULTI-FUNCTIONAL COVER FOR SAME

FIELD OF THE INVENTION

The present invention generally relates to a motor vehicle having a luggage compartment and, in particular, to a multi-functional cover for use in obscuring view objects carried in the luggage compartment and having other uses relating to the motor vehicle.

BACKGROUND OF THE INVENTION

It is generally well-known to provide a rigid cover for a load space or luggage compartment of a motor vehicle to cover items carried in the load space so that they are obscured from view. It can be a problem with such conventional covers that they often only provide coverage for the area located behind the rearmost row of seating and so if the load space is extended by folding down the rearmost row of seats, then objects placed in a front part of the luggage compartment are not concealed from view. Additionally, such rigid load space covers are difficult to stow on the vehicle if not required such as when carrying bulky objects.

It is further known to provide a load space cover that is made from a flexible material that is wound onto a roller when not in use and is rolled out when required to cover the load space. Such load space covers are relatively expensive to manufacture and can only provide cover for the area to the rear of the location in which the roller is attached to the motor vehicle.

It would be desirable to provide a motor vehicle having a flexible load space cover that is of a simple and cost effective construction and provides increased versatility.

SUMMARY OF THE INVENTION

According to one embodiment, a motor vehicle is provided. The motor vehicle includes a passenger compartment, and first and second rows of seating mounted in the passenger compartment, the second row of seating being mounted to the rear of the first row of seating and being movable between a normal passenger seating position in which the second row of seating forms a front boundary of a rear load space of the motor vehicle and a stowed position in which the second row of seating is folded and the first row of seating forms the front boundary of the rear load space. The motor vehicle also includes a hinged rear closure member to provide access to the rear load space, a rear boundary of the rear load space being formed at least partially by the rear closure member when the rear closure member is in a closed position. The motor vehicle further includes a substantially rectangular flexible sheet forming a flexible cover configurable to conceal items located in the load space from view and having a plurality of transversely extending elongate stiffeners forming natural fold lines to aid folding of the flexible cover, wherein when the second row of seating is in the stowed position, the flexible cover is configured in an extended configuration so as to extend from a position adjacent the front row of seating to a position adjacent the rear closure member when the rear closure member is in the closed position and, when the second row of seating is in the normal passenger seating position, the flexible cover is configured in a folded configuration in which the flexible cover is folded back onto itself and the flexible cover extends from a position adjacent the second row of seating to a position adjacent the rear closure member when the rear closure member is in the closed position.

According to another aspect of the invention, a multi-functional flexible cover for attachment to a motor vehicle having a rear load space accessible via a rear closure member wherein the flexible cover comprises a substantially rectangular flexible sheet of material having a plurality of transversely extending elongate stiffeners forming natural fold lines to aid folding of the flexible cover and the flexible cover is configurable in a number of configurations including at least a first configuration in which the flexible cover is folded back upon itself to form a small load space cover for a rear load space of the motor vehicle and a second configuration in which the flexible cover is extended to form a large rear load space cover for the motor vehicle.

According to a further aspect of the invention, a flexible cover for a rear load space of a motor vehicle is provided. The flexible cover for a rear load space of a motor vehicle includes a substantially rectangular flexible sheet of material configured to cover the rear load space which is accessible via a rear closure member and a plurality of transversely extending elongate stiffeners forming natural fold lines to aid folding of the flexible cover.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 15a is a rear perspective view of the rear end of a motor vehicle with a rear closure member in an open position and the flexible cover in an extendible rain cover configuration attached to a free end of the open rear closure member;

FIG. 15b is a side view of the rear end of the motor vehicle shown in FIG. 15a with the rear closure member in the open position and the flexible cover extended;

FIG. 17 is a plan view of a flexible cover in an unfolded state showing a number of internal stiffeners having end portions projecting out from the flexible material of the flexible cover; and FIG. 18 is a plan view of a flexible cover in an unfolded state showing a number of internal stiffeners that do not project out from the flexible material of the flexible cover.

DETAILED DESCRIPTION OF THE PREFERRED EMBODIMENTS

Figure 1A:
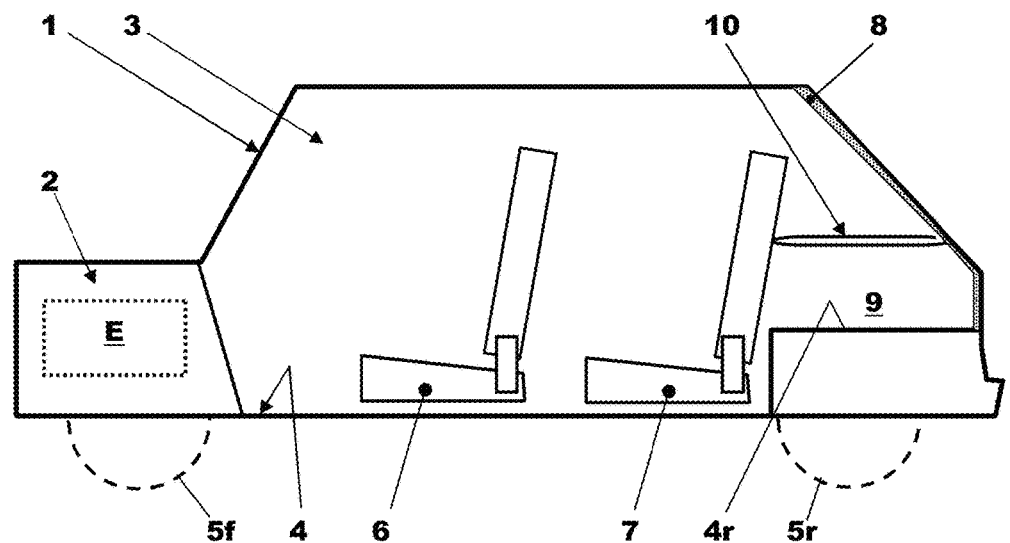
FIG. 1a is a diagrammatic cut-away side view of a motor vehicle having two rows of seating and a flexible cover in a folded configuration according to a first embodiment.
Figure 1B:
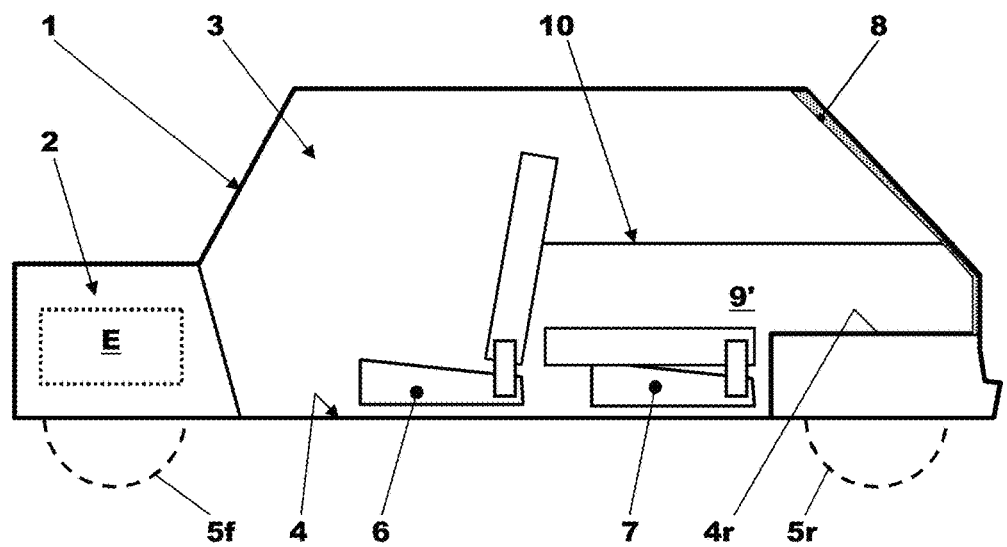
FIG. 1b is a diagrammatic cut-away side view similar to that of FIG. 1b but showing the flexible cover in an extended configuration.
Figure 6:
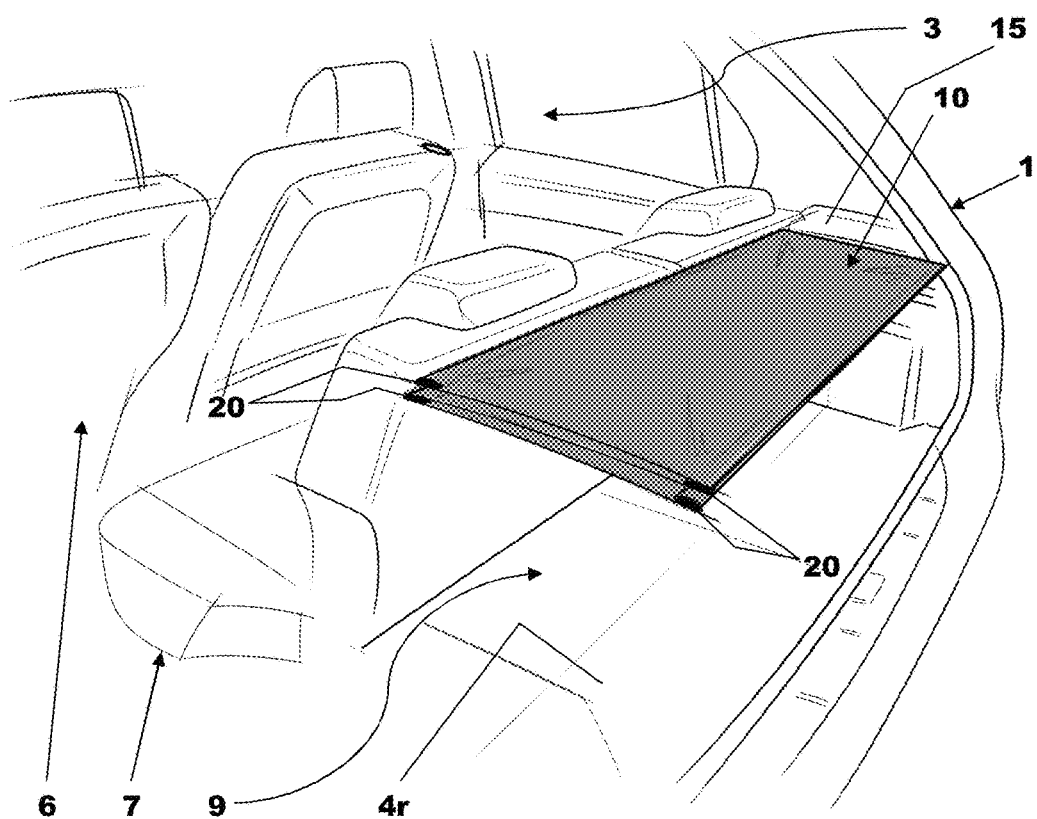
FIG. 6 is a rear interior pictorial view of the motor vehicle shown in FIGS. 1a, 1b and 2 with a hinged rear closure in an open position showing the flexible cover in a folded configuration covering a load space defined to a rear of a second row of seating.
Figure 7:
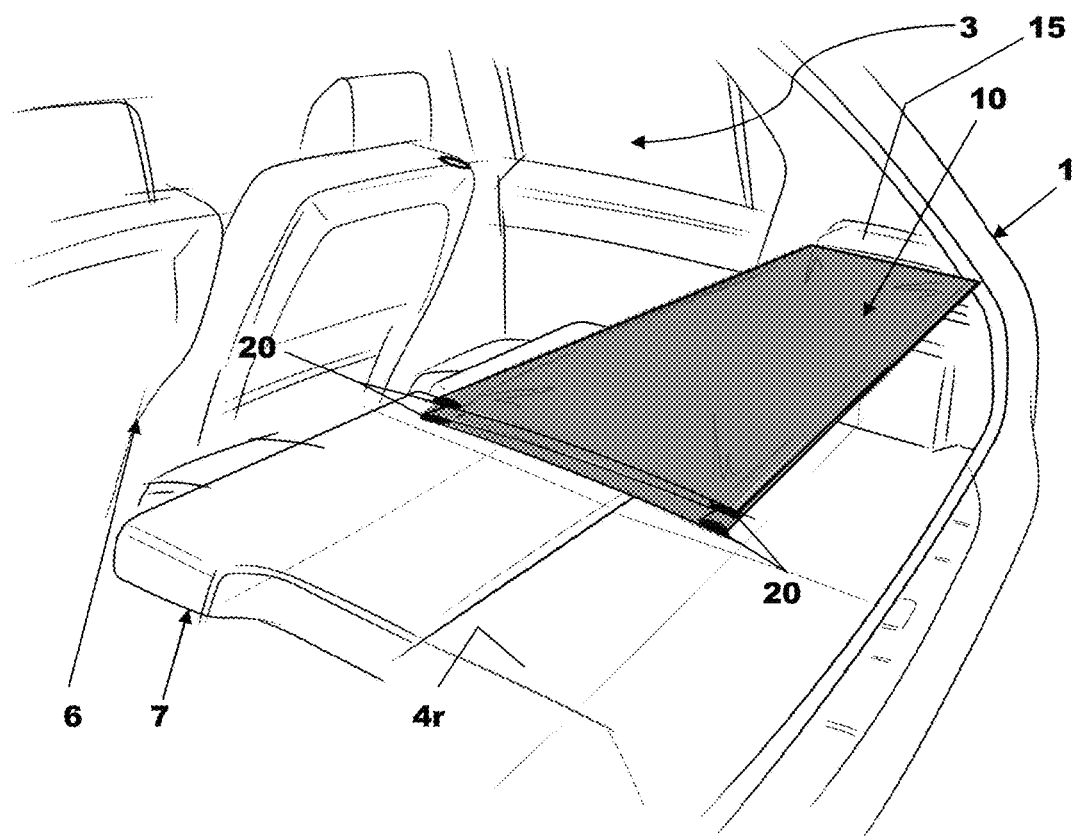
FIG. 7 is a rear interior pictorial view similar to that of FIG. 6 but showing the second row seating in a stowed position.
Figure 8:
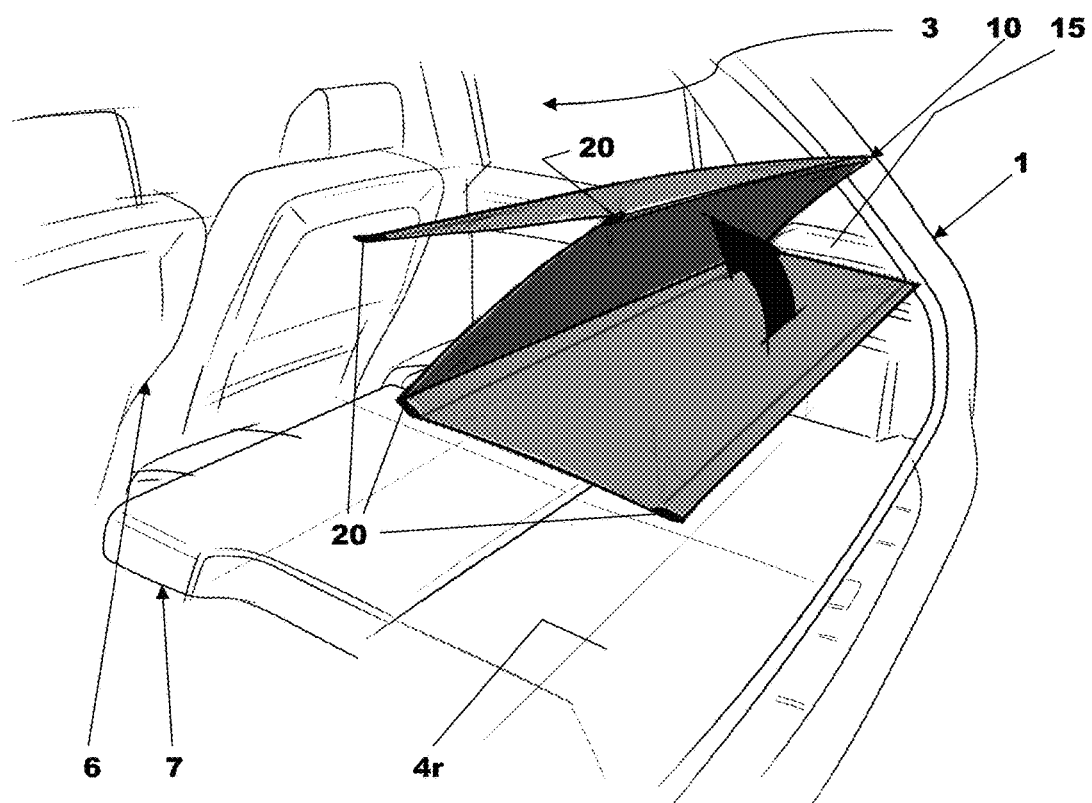
FIG. 8 is a rear interior pictorial view similar to FIG. 7 but showing the flexible cover during a transition from the folded configuration shown in FIG. 7 to an extended configuration shown in FIG. 9.
Figure 9:
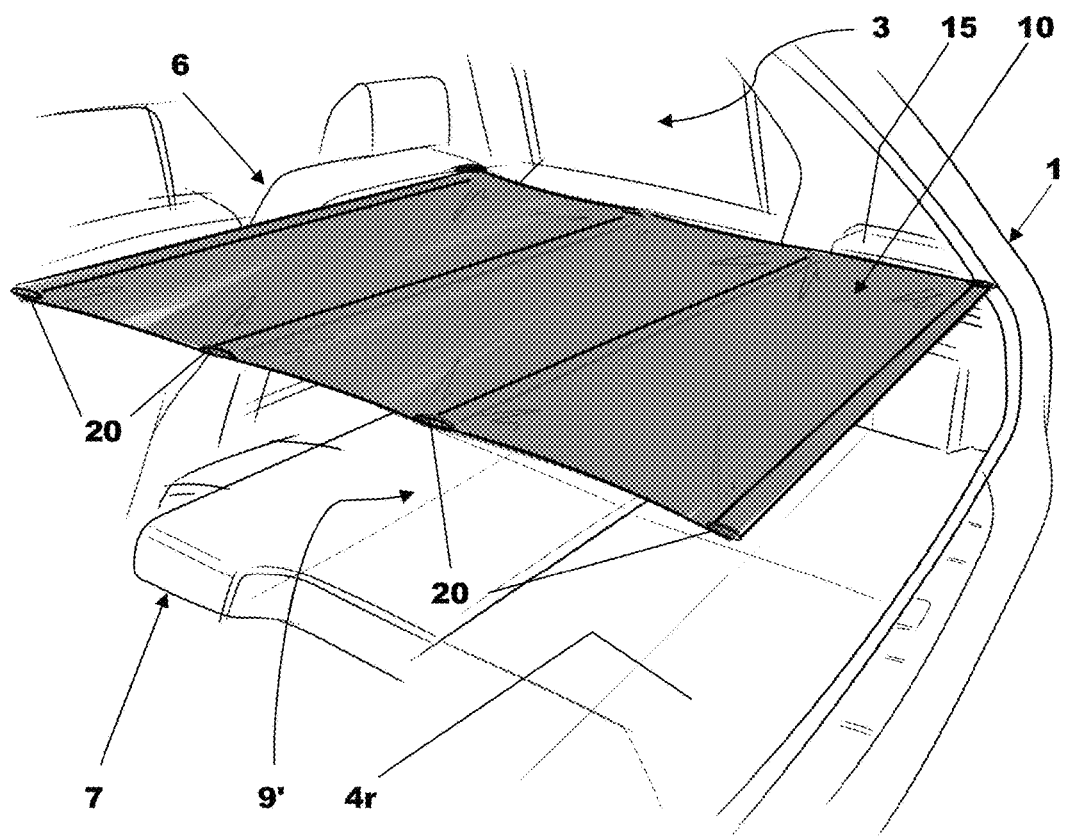
FIG. 9 is a rear interior pictorial view showing the flexible cover in an extended or unfolded configuration extending from a first row of seating to a rear of a passenger compartment of the motor vehicle.

With particular reference to FIGS. 1a, 1b and 6-9 there is shown a motor vehicle 1 having an engine compartment 2 and a passenger compartment 3. First and second rows of seating 6 and 7 are mounted in the passenger compartment on a floor 4 of the motor vehicle 1. In the case of this example, the motor vehicle 1 also includes a false floor 4r defining a small storage space between the false floor 4r and the floor 4. The second row of seating 7 is mounted to the rear of the first row of seating 6 and is movable or transformable between a normal passenger seating position as shown in FIGS. 1a and 6 in which the second row of seating 7 forms a front boundary of a rear load space 9 of the motor vehicle 1 and a stowed position as shown in FIGS. 1b and 9 in which the second row of seating 7 is folded and the first row of seating 6 forms the front boundary of an enlarged rear load space 9'.

A hinged rear closure member 8, in the form of a top hinged hatch, provides access to a rear end of the rear load space 9 and is shown in a closed position in FIGS. 1a and 1b. It will be appreciated that the motor vehicle and flexible cover is not limited to vehicles having a top hinged hatch and can be used with equal benefit on vehicle having one or more side hinged doors or horizontally split rear doors having upper and lower hinged parts. The motor vehicle and flexible cover is particularly applicable to hatchback vehicles, sports utility vehicles and multi-purpose vehicles having rear access to a rear load space or rear luggage compartment.

A rear boundary of the rear load space 9 is formed at least partially by an inner surface of the rear closure member 9 when it is in the closed position shown in FIGS. 1a and 1b. A flexible cover 10 is configurable to conceal items located in the rear load space 9 from view irrespective of whether the second row of seating 7 is in the normal passenger seating position or the stowed position. The flexible cover 10 is substantially rectangular in shape and has a number of transversely extending elongate stiffeners 20 forming natural fold lines to aid folding of the flexible cover 10 for reconfiguring the flexible cover.

When the second row of seating 7 is in the stowed position as shown in FIGS. 1b and 9, the flexible cover 10 is configured in an extended configuration so as to extend from a position adjacent the front row of seating 6 to a position adjacent the rear closure member 8 when the rear closure member 8 is in the closed position. As will be described hereinafter the flexible cover 10 is held taut when in this extended configuration.

When the second row of seating 7 is in the normal passenger seating position as shown in FIGS. 1a and 6, the flexible cover 10 is configured in a folded configuration in which the flexible cover 10 is folded back onto itself and the flexible cover 10 extends from a position adjacent the second row of seating 7 to a position adjacent the rear closure member 8 when the rear closure member 8 is in the closed position. As shown in FIG. 6 the flexible cover 10 is folded back twice on itself so that in this case it comprises three panels separated by two elongate stiffeners 20 and has an elongate stiffener 20 at each end.

Figure 2:
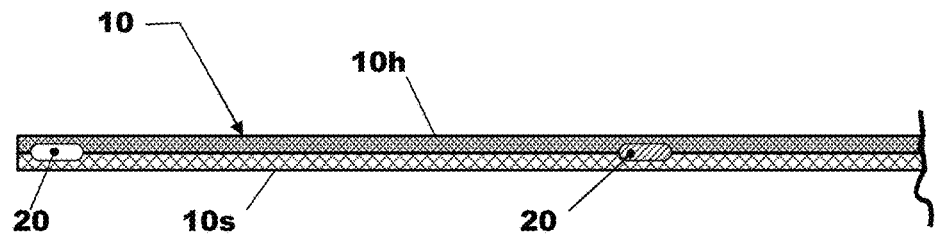
FIG. 2 is a cross section through a multi-functional flexible cover according to one embodiment.

As shown in FIG. 2 the flexible cover 10 is made from a first layer 10h of tough resilient material and a second layer 10s of soft material secured together to form the flexible cover 10. The two layers 10h and 10s can be secured together by various means such as sewing and adhesive bonding. The transversely extending stiffeners 20 are interposed between the first and second layers 10h and 10s forming the flexible cover 10 and in the case of the examples shown in FIGS. 3a to 4b and FIG. 17 extend beyond the lateral sides of the material forming the flexible cover 10. The ends of the stiffeners 20 are with such a construction used to attach the flexible cover 10 to the motor vehicle 1.

Figure 3A:
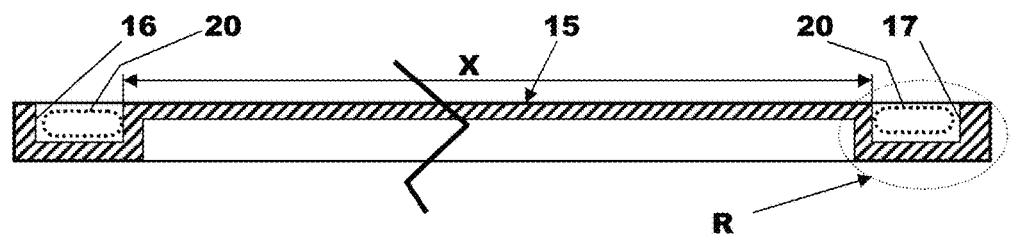
FIG. 3a is a cross section through a side trim panel of the motor vehicle showing a first embodiment of a flexible cover attachment.
Figure 3B:
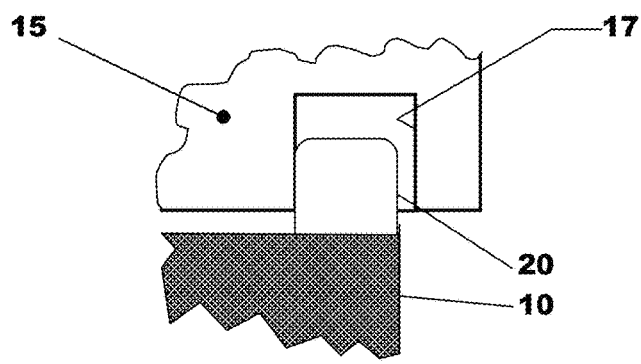
FIG. 3b is a plan view of part of the side trim panel shown as region R on FIG. 3a showing the engagement of an end portion of a stiffener with a recess in the trim panel.

In a first embodiment of an attachment shown in FIGS. 3a and 3b end portions of predefined stiffeners 20 are engageable with recesses 16, 17 formed as part of a side trim panel 15 of the motor vehicle 1. The end portions of stiffeners 20 that are engaged will depend upon the configuration of the flexible cover 10 that is to say whether it extends from the first row of seating 6 to the rear of the rear load space 9, from the second row of seating 7 to the rear of the rear load space 9 or in another configuration such as the small item carrier configuration shown in FIG. 14 in which the small item is an umbrella 60.

When the flexible cover 10 is in use as a load space cover as shown in FIGS. 1a, 1b, 6 and 9 it is attached to the motor vehicle 1 so as to be held taut. In one embodiment in which the flexible cover 10 is made from stretchable material it is held taut by being kept in a state of extension by the attachment of the flexible cover 10 to the motor vehicle 1.

In FIG. 3a the distance between two recesses 16 and 17 is shown as 'X' and to hold the flexible cover 10 taut the distance between the two corresponding stiffeners 20 is, when the flexible cover 10 is in a relaxed state, slightly less than 'X'. Therefore engagement of the stiffeners 20 with the recesses 16, 17 requires the flexible cover 10 to be stretched or placed into a state of extension and it is this extension of the flexible cover 10 that holds it taut.

Figure 4A:
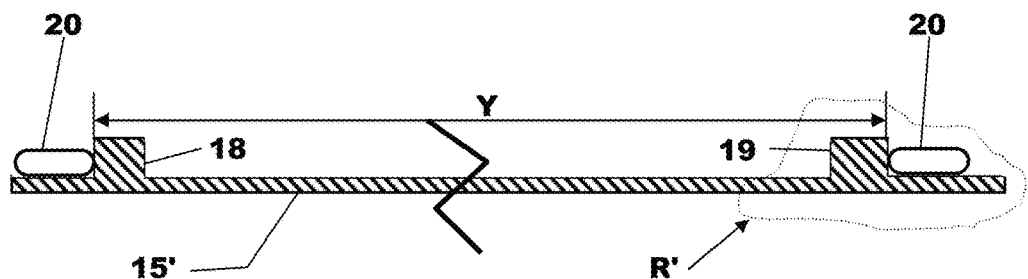
FIG. 4a is a cross section through a side trim panel of a vehicle showing a second embodiment of a flexible cover attachment.
Figure 4B:
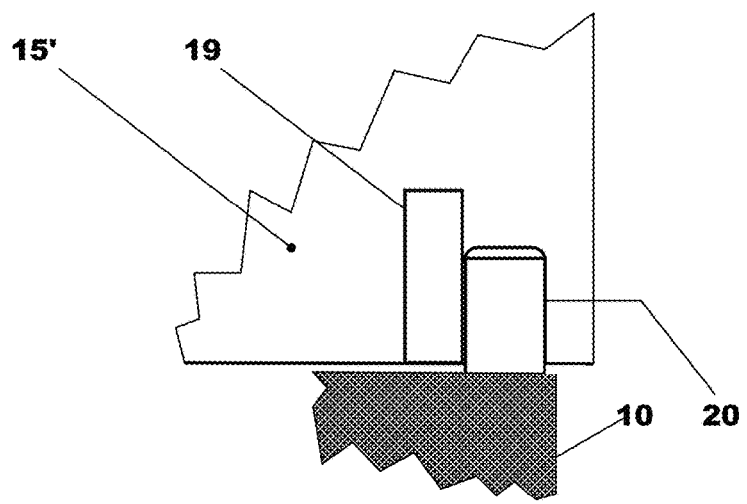
FIG. 4b is a plan view of part of the side trim panel shown as region R' on FIG. 4a showing the engagement of an end portion of a stiffener with a lug on the trim panel.

In a second embodiment of an attachment shown in FIGS. 4a and 4b, end portions of predefined stiffeners 20 are engageable with lugs 18, 19 formed as part of a side trim panel 15 of the motor vehicle 1. The end portions of stiffeners 20 that are engaged will depend upon the configuration of the flexible cover 10, that is to say, whether it extends from the first row of seating 6 to the rear of the rear load space 9, from the second row of seating 7 to the rear of the rear load space 9 or in another configuration such as the small item carrier configuration shown in FIG. 14 in which the small item is an umbrella 60.

When the flexible cover 10 is in use as a load space cover as shown in FIGS. 1a, 1b, 6 and 9 it is attached to the motor vehicle 1 so as to be held taut. In a preferred embodiment in which the flexible cover 10 is made from stretchable material it is held taut by being kept in a state of extension by the attachment of the flexible cover 10 to the motor vehicle 1.

In FIG. 4a the distance between two lugs 18, 19 is shown as 'Y' and to hold the flexible cover 10 taut the distance between the two corresponding stiffeners 20 is, when the flexible cover 10 is in a relaxed state, slightly less than 'Y'. Therefore engagement of the stiffeners 20 with the lugs 16, 17 requires the flexible cover 10 to be stretched or placed into a state of extension and it is this extension of the flexible cover 10 that holds the flexible cover 10 taut.

Figure 5A:
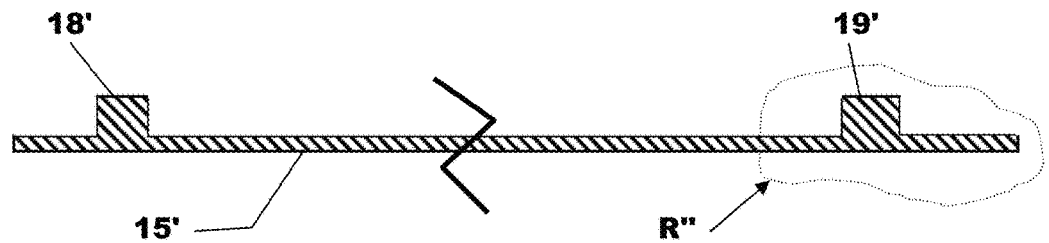
FIG. 5a is a cross section through a side trim panel of a vehicle showing a third embodiment of a flexible cover attachment.
Figure 5B:
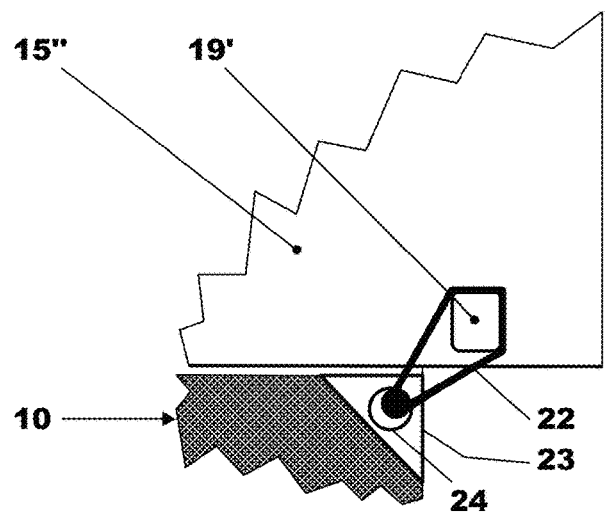
FIG. 5b is a plan view of part of the side trim panel shown as region R" on FIG. 5a showing the engagement of a fixing strap with a lug on the trim panel.
Figure 5C:
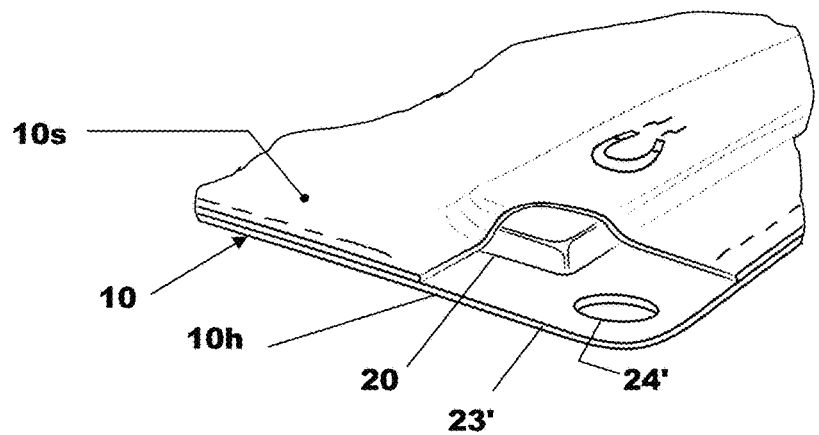
FIG. 5c is an enlarged view of a corner of the flexible cover showing part of an attachment.

In a third embodiment of an attachment shown in FIGS. 5a to 5c the stiffeners 20 do not extend beyond the width of the flexible material forming the flexible cover 10. At various positions attachment holes 24, 24' present in the flexible cover 10 for use in attaching the flexible cover 10 to the motor vehicle 1 at least when the flexible cover 10 is being used as a load space cover.

Fastening straps 22 are engageable with the holes 24, 24' formed in corner portions 23, 23' of the flexible cover 10 and with attachment on the vehicle such as lugs 18', 19' formed as part of a side trim panel 15 of the motor vehicle 1. It will be appreciated that further attachment will be located close to the first row of seating 6 for use in connecting the respective fastening straps to the motor vehicle 1 and at other positions required to support the flexible cover 10 in the various configurations available.

The lugs 18', 19' and the fastening straps 22 are positioned such that when the fastening straps 22 are engaged with the lugs 18', 19' the portion of the flexible cover 10 between the lugs 18', 19' is held taut. In one embodiment the fastening straps 22 are made from substantially inextensible material and the flexible cover 10 is made from stretchable material that is extended when the straps are engaged with the lugs 18', 19' and in another embodiment in which the flexible cover 10 is made from an inextensible material, the fastening straps 22 are elastic straps used to hold the flexible cover 10 taut.

The transversely extending stiffeners 20 can be of various forms and stiffness's. In the case where end portions of the stiffeners 20 are used to attach the flexible cover 10 to the motor vehicle 1 such as shown in FIG. 17 then the stiffeners will normally comprise an elongate length of a semi-rigid structural material such as an extruded plastics material.

Preferable a first type of stiffener includes magnetic material and a second type of stiffener includes material that is attracted by the magnetic material of the first type. When first and second type stiffeners are brought together they act as a latch holding the flexible cover 10 in the respective folded configuration.

The first type of stiffener can be formed by adhesively attaching a length or several lengths of magnetic tape (such as the magnetic tape available from Eclipse Magnetics Ltd, Atlas Way, Sheffield, S4 7QQ, UK) to an elongate plastic stiffener.

The second type of stiffener can be formed by using an elongate thin strip of a ferromagnetic material such as steel or by adhesively bonding one or more length of steel tape (such as the steel tape available from Eclipse Magnetics Ltd, Atlas Way, Sheffield, S4 7QQ, UK) to an elongate plastic stiffener.

In the case where the stiffeners 20 are used only to form convenient fold lines and are not used to attach the flexible cover 10 to the motor vehicle 1, such as the flexible cover 10 shown in FIG. 18, a very thin flat flexible strip can be used, preferably one that has a different bending stiffness in different directions.

As before, it may be preferable if a first type of stiffener includes magnetic material and a second type of stiffener includes material that is attracted by the magnetic material of the first type so that when first and second type stiffeners are brought together they act as a latch holding the flexible cover 10 in the respective folded configuration.

In this case, the first type can comprise a flexible magnetic strip such as the magnetic tape available from Eclipse Magnetics Ltd, Atlas Way, Sheffield, S4 7QQ, UK and the second type can comprise a thin steel strip such as the steel tape available from Eclipse Magnetics Ltd, Atlas Way, Sheffield, S4 7QQ, UK. It will be appreciated that the second type can be formed of a thin strip of any suitable ferromagnetic material and is not limited to the use of steel tape.

The use of the flexible cover 10 as a load space cover will now be described in more detail with reference to FIGS. 6-9. In FIG. 6 the flexible cover 10 is shown in a folded configuration in which it forms a cover for the rear load space 9 defined by the false floor 4r, opposed interior sides of the motor vehicle 1 and bounded at the front and rear respectively by the second row seating 7 in a normal passenger seating position and the rear closure member 8 when in a closed position.

In FIG. 7, a first stage of transformation is shown in which the second row seating 7 has been transformed into a stowed position by folding backrests forming part of the second row seating forward. Note that in this embodiment the false floor 4r is positioned so as to form a substantially flat load carrying surface with the folded forward backrests of the second row seating 7.

In FIG. 8, the flexible cover 10 is shown in a partially unfolded state and is in the process of being transformed into an extended state.

In FIG. 9, the flexible cover 10 has been fully extended so as to cover the extended rear load space 9'.

The extended rear load space 9' is defined by the false floor 4r, the stowed second row seating 7, opposed interior sides of the motor vehicle 1 and is bounded at the front and rear, respectively, by the first row seating 6 in a normal passenger seating position and the rear closure member 8 when in a closed position.

The flexible cover 10 is held in a taut state in this case by the engagement of end portions of a front one of the stiffeners 20 with a pair of attachment members (not shown) on the motor vehicle 1 and by the engagement of end portions of a rear one of the stiffeners 20 with a pair of attachment members (not shown) on the motor vehicle 1. The spacing of the attachment members on the motor vehicle 1 is such that the flexible cover 10 is stretched slightly by the engagement therewith and is therefore held in a state of extension during use. The flexible cover 10 is normally orientated such that the first layer 10h of tough resilient material faces up and the second layer 10s of soft material faces down.

Figure 10:
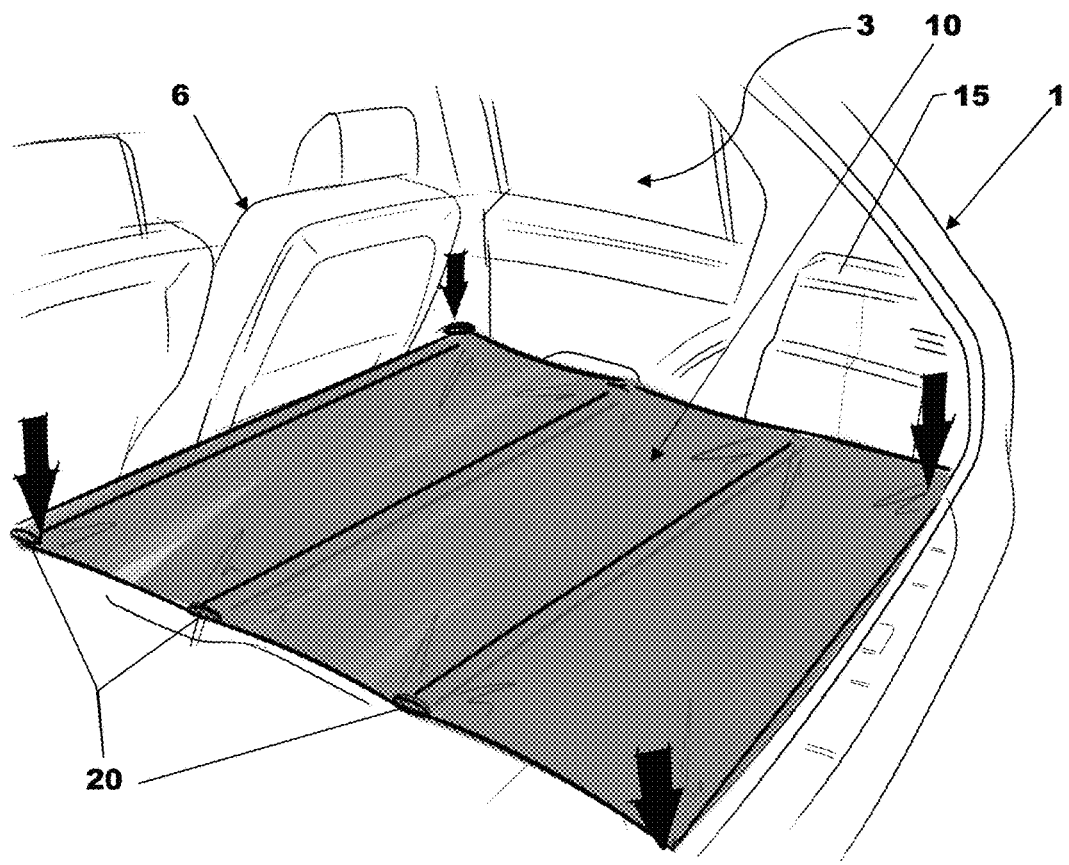
FIG. 10 is a rear interior pictorial view of the motor vehicle shown in FIGS. 1a, 1b and 2 with a hinged rear closure in an open position showing the flexible cover in a load space floor cover configuration in which it covers the floor of a load space extending from the first row of seating to the rear of a passenger compartment of the motor vehicle.

In FIG. 10 the flexible cover 10 is shown in a floor covering configuration which is similar to that shown in FIG. 9 but differs in that in this configuration the flexible cover 10 lies in a relaxed state on the floor of the extended rear load space 9'. The flexible cover 10 is orientated so that the first layer 10h of tough resilient material faces up so as to resist damage and abrasion from items carried by the vehicle 1 and the second layer 10s of soft material faces down so as to lie upon the stowed second row seating 7 and the false floor 4r. As indicated by the four arrows on FIG. 10, the corners of the flexible cover 10 can be secured in position.

Figure 11:
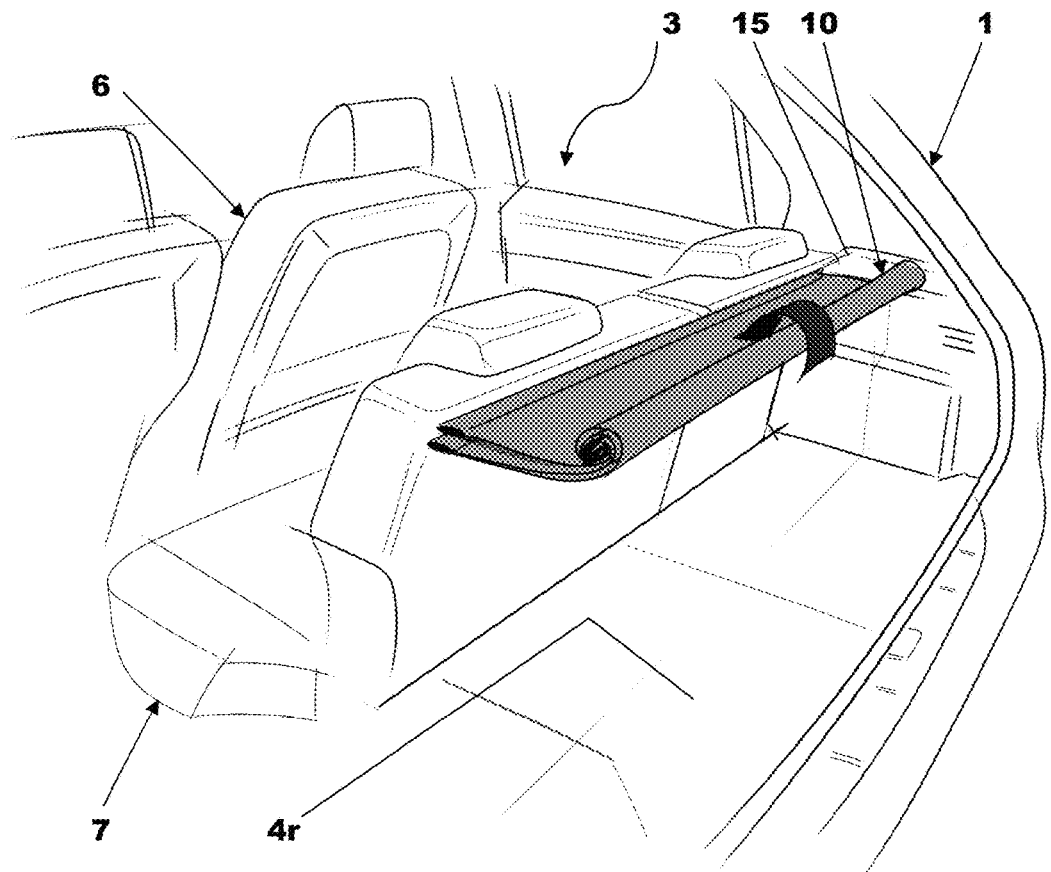
FIG. 11 is a rear interior pictorial view similar to FIG. 6 but showing the flexible cover in a partially rolled up configuration.
Figure 12:
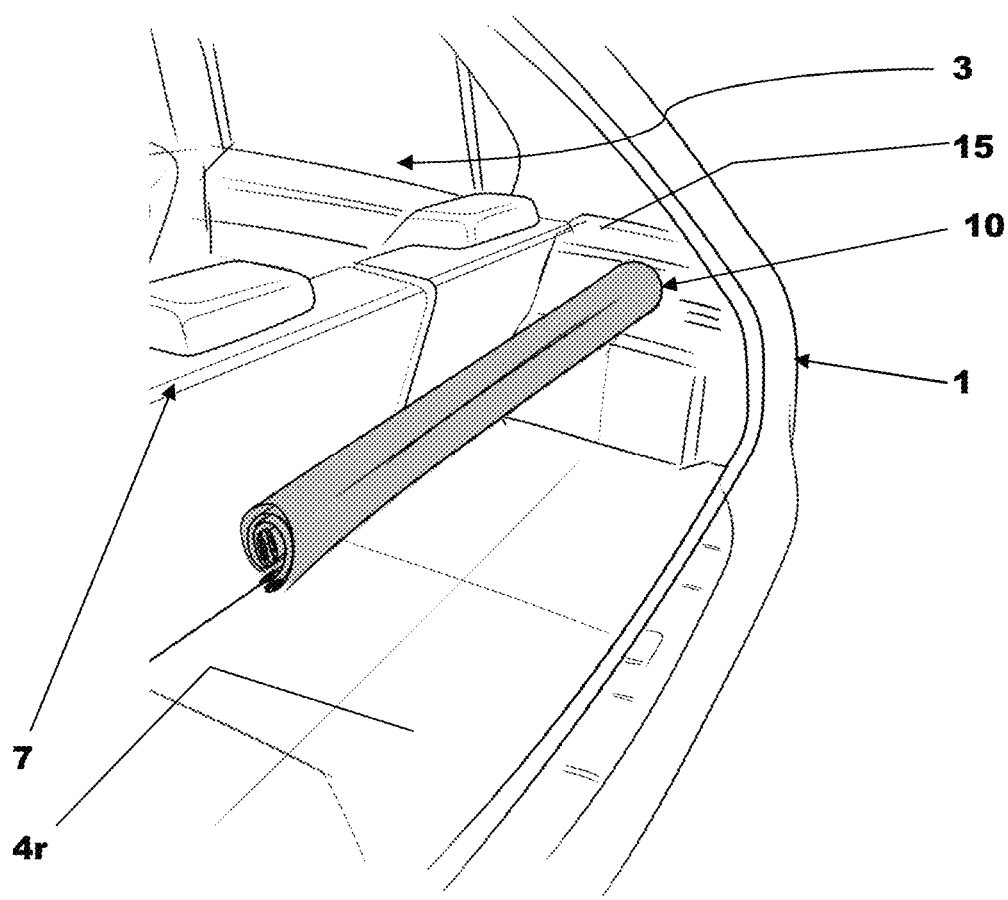
FIG. 12 is a rear interior pictorial view similar to FIG. 11 but showing the flexible cover fully rolled up ready for stowage.

FIGS. 11 and 12 show how the flexible cover 10 can be reconfigured by rolling it up into a stowed state in which it forms an elongate roll of material that is easily stowed in the passenger compartment 3 of the motor vehicle 1.

Figure 13:
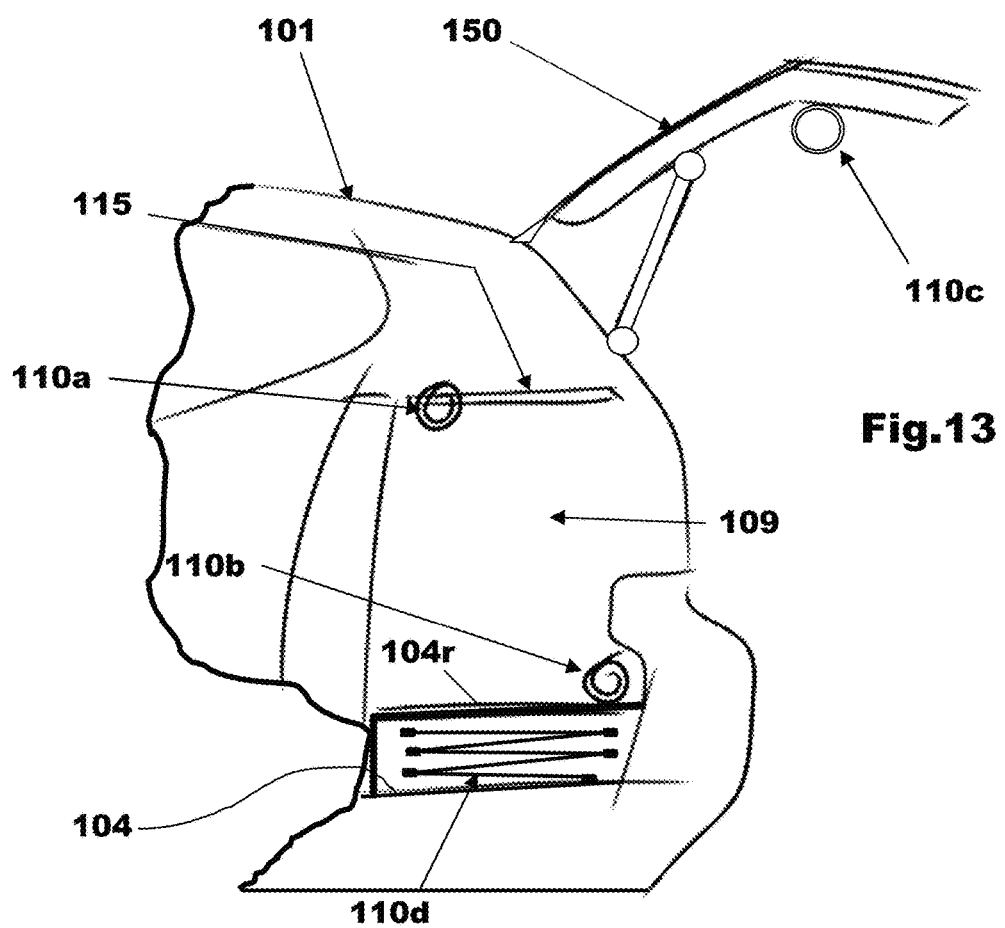
FIG. 13 is a cut-away side view of a motor vehicle showing three alternative stowage locations for a rolled up flexible cover within a passenger compartment of the motor vehicle.

FIG. 13 shows a motor vehicle 101 having a rear closure member in the form of a hatch 150 in an open position, a load space 109 and four alternative positions for stowing a flexible cover indicated by the reference numbers 110a, 110b, 110c and 110d. The flexible cover 110a is shown stowed so as to span between two side trim panels 115, the flexible cover 110b is shown stowed on a false floor 104 of a load space 109 in a rolled up state and the flexible cover 110c is shown stowed on an inner surface of the hatch 150.

The flexible cover is in each of the previously described cases stowed in the load space at the rear of the passenger compartment of the motor vehicle 101. It will be appreciated that, in the case of the hatch 150 storage location, the flexible cover 110c is in the rear load space at the rear of the passenger compartment when the hatch 150 is in a closed position.

In the case of the position indicated by the reference number 110d, the flexible cover is, unlike the previous examples, not rolled up but is folded up and stowed in a space between the false floor 104r and a floor 104 of the motor vehicle 101.

Figure 14:
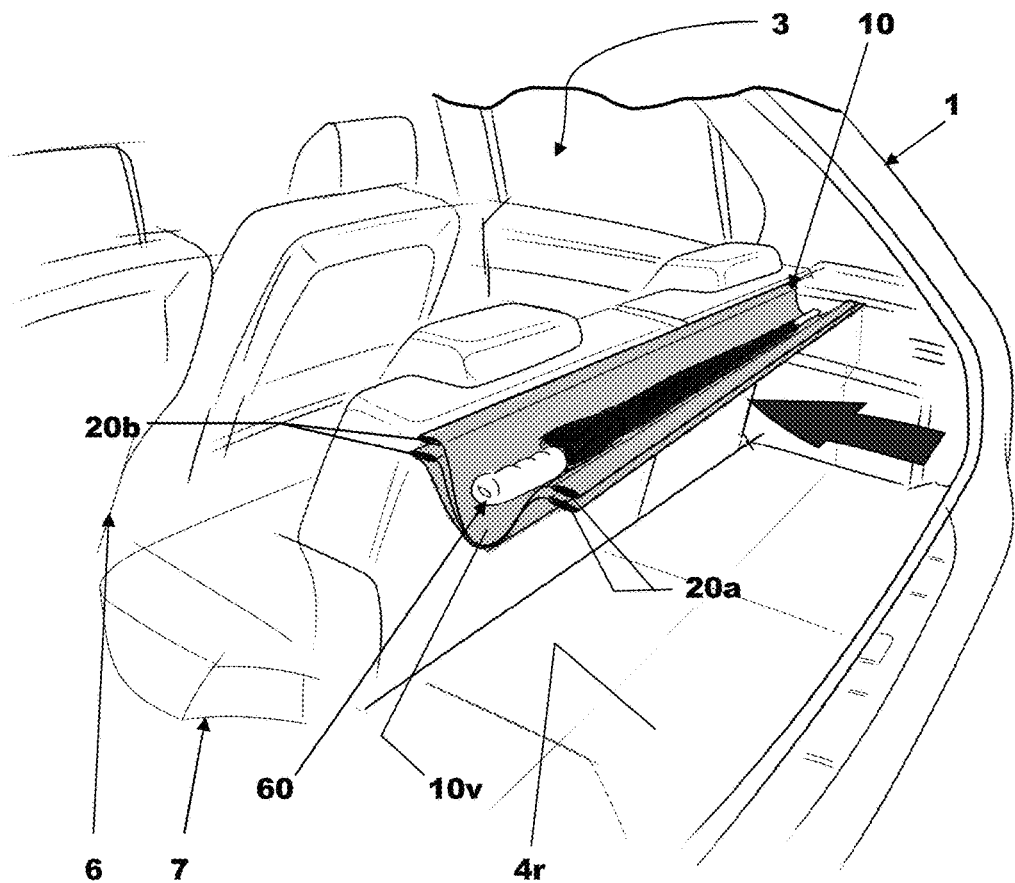
FIG. 14 is a rear interior pictorial view similar to FIG. 6 but showing the flexible cover in a small item carrier configuration showing a small item in the form of an umbrella being supported by the flexible cover.

Referring now to FIG. 14 there is shown another configuration of the flexible cover 10 in which it is folded and attached so as to lie above the rear load space 9. The attachment of the flexible cover 10 to the motor vehicle 1 is such that the flexible cover 10 forms a shallow valley 10v in which small items can be transported. In FIG. 14 the small item being transported is an umbrella 60 but it will be appreciated that other similar small and relatively light items could be transported in a similar manner. As indicated by the arrow on FIG. 14, the shallow valley 10v is formed by moving the stiffeners 20a forwardly from their normal load space covering position shown in FIG. 6 to a more forward position where they are located closer to the stiffeners 20b extending across the motor vehicle 1 to the rear of the second row seating 7. This produces slack in the flexible cover 10 which then sags under the effect of gravity to form the shallow valley 10v. It will be appreciated that the stiffeners 20a may be held together by magnetic attraction as previously described as may the stiffeners 20b.

In FIGS. 15a and 15b the flexible cover 10 is shown in use on the motor vehicle 101 configured as a rain cover. One end of the flexible cover 10 is attached to near a free edge of the hatch 150 with the hatch in an open position. The distal end of the flexible cover 10 is attached to a pair of extendible poles 138 that, in the case of this example, have been driven into the ground but which could alternatively be secured using guy ropes or the like. The flexible cover 10 is held relatively taut by the two poles 138 and adjustable straps could be used to attach the free end of the flexible cover 10 to the two poles.

A small protected area is then produced to the rear of the motor vehicle 101 which provides limited protection from rain or the like. It will be appreciated that when so configured the flexible cover could alternatively be used to provide protection from the sun and so could be referred to as a weather protector.

Figures 16A, 16B:
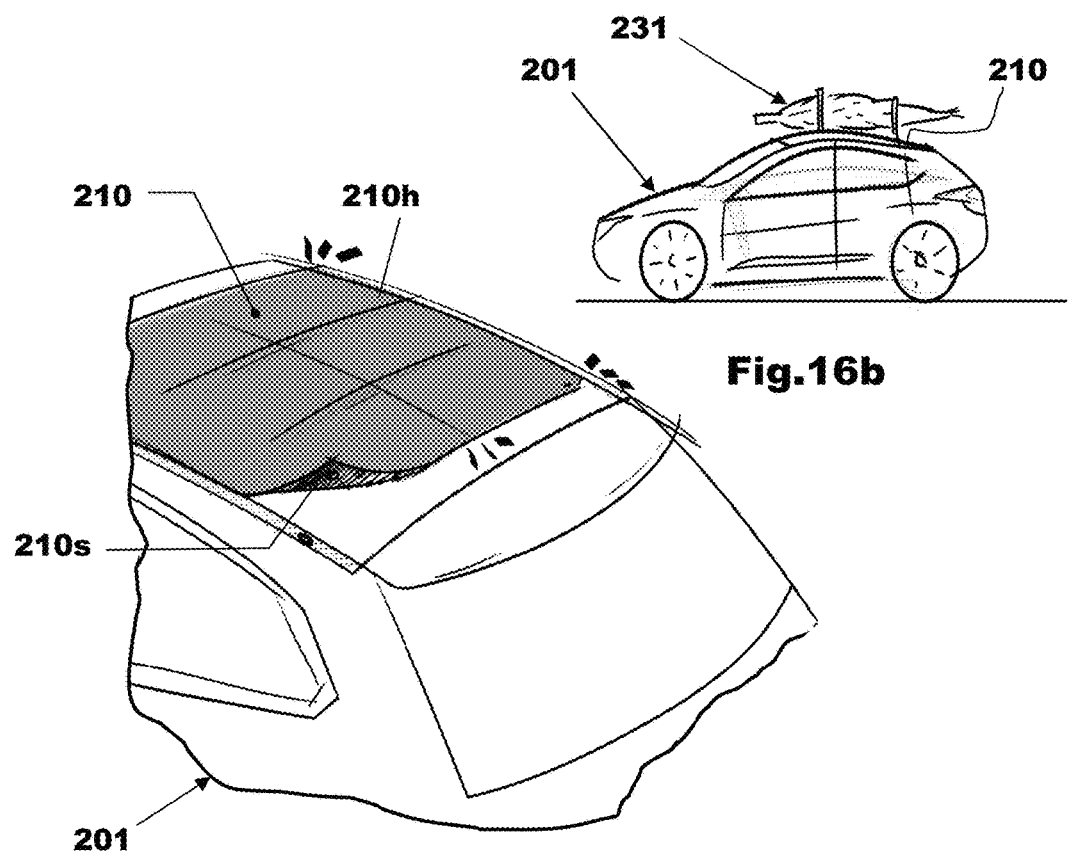
FIG. 16a is a three quarter rear external view of part of a motor vehicle showing the flexible cover configured as a roof protector.
FIG. 16b is a side view of the motor vehicle shown in FIG. 16a showing an item being transported on the roof of the motor vehicle.

With reference to FIGS. 16a and 16b, a flexible cover 210 is shown configured as a roof protector for a vehicle 201. The flexible member 210 is the same as previously described and has a soft side 210s that lies upon the roof of the motor vehicle 201 and a tough side 210h that faces up. The flexible cover 210 is held in place in this case by the use of magnetic attraction between the vehicle roof and flexible magnets embedded within the flexible cover 210. As shown in FIG. 16b, when an object 231 is placed upon the roof of the motor vehicle 201 it rests upon the flexible cover 210 which prevents the roof of the motor vehicle 201 from getting scratched by the object 231.

Although the vehicle and flexible cover have been described with reference to a motor vehicle having two rows of seating it will be appreciated that it could also be applied to a motor vehicle having three rows of seating. In such a case the first row of seating forms a front row of seating, the second row of seating forms a rear row of seating and there is a further row of seating located between the first and second rows of seating. The second and further rows of seating may both have normal passenger seating and stowed positions.

When the second row of seating is in the normal passenger seating position, the second row of seating forms a front boundary of the rear load space and a flexible cover can be configured in a folded configuration so as to extend from a position adjacent the second row of seating to a position adjacent a rear closure member when the rear closure member is in the closed position.

When the second row of seating is in the stowed position and the further row of seating is in the normal passenger seating position, the further row of seating forms the front boundary of the rear load space and the flexible cover can be configured in a partially folded configuration so as to extend from a position adjacent the further row of seating to a position adjacent the rear closure member when the rear closure member is in the closed position.

When the second and further rows of seating are both in their respective stowed positions, the flexible cover can be configured in an extended or unfolded configuration so as to extend from a position adjacent the front row of seating to a position adjacent the rear closure member when the rear closure member is in the closed position.

Therefore, in summary the flexible cover provides a flexible load space cover have great utility that is multi-functional in nature.

In a particularly favorably embodiment, the flexible cover comprises of two sheet fabric materials which have stretch properties and which are secured together.

Preferably flexible magnetic stiffening strips are integrated between the layers of the flexible cover to facilitate intuitive folding into predetermined configurations by the user. The stiffening strips may also provide some unidirectional structure to the flexible cover similar to a composite tent pole.

The magnetic strips generally may not be the sole means of securing the flexible cover in place in the vehicle and may be supplemented by mechanical fixings.

The use of flexible fabric like material allows the flexible cover to be folded into various configurations for multiple functions.

Because the flexible cover can be easily folded, it can be large enough when extended to cover the full load space, that is to say, the load space provided when all foldable rows of seating are stowed and can be folded back upon itself to cover only a small load area when the rearmost row of seating is in a normal passenger seating position.

The use of multiple layers provides a double sided versatility that can be waterproof/tough on one side and have soft finish on the other that can for example be used:

a/ on a load space floor as a liner/protective cover with the soft side down and the tough side up;

b/ on the roof as a protective cover with the soft side down and the tough side up;

c/ be removed from the motor vehicle for use on the ground as a picnic blanket with the tough side down and the soft side up; and d/ as an extension to a tailgate or hatch as a rain cover or sunshade.

According to one embodiment, there is provided a motor vehicle having a passenger compartment, first and second rows of seating mounted in the passenger compartment, the second row of seating being mounted to the rear of the first row of seating and being movable between a normal passenger seating position in which the second row of seating forms a front boundary of a rear load space of the motor vehicle and a stowed position in which the second row of seating is folded and the first row of seating forms the front boundary of the rear load space, a hinged rear closure member to provide access to the rear load space, a rear boundary of the rear load space being formed at least partially by the rear closure member when the rear closure member is in a closed position and a substantially rectangular flexible sheet forming a flexible cover configurable to conceal items located in the load space from view and having a number of transversely extending elongate stiffeners forming natural fold lines to aid folding of the flexible cover wherein, when the second row of seating is in the stowed position, the flexible cover is configured in an extended configuration so as to extend from a position adjacent the front row of seating to a position adjacent the rear closure member when the rear closure member is in the closed position and, when the second row of seating is in the normal passenger seating position, the flexible cover is configured in a folded configuration in which the flexible cover is folded back onto itself and the flexible cover extends from a position adjacent the second row of seating to a position adjacent the rear closure member when the rear closure member is in the closed position.

The motor vehicle may have two rows of seating and the first row of seating may be a front row of seating and the second row of seating may be a rear row of seating. Alternatively, the motor vehicle may have three rows of seating and the first row of seating may be a middle row of seating and the second row of seating may be a rear row of seating.

As yet a further alternative, the first row of seating may be a front row of seating, the second row of seating may be a rear row of seating and there is a further row of seating located between the first and second rows of seating, the further row of seating having normal passenger seating and stowed positions and when the second row of seating is in the stowed position and the further row of seating is in the normal passenger seating position, the further row of seating may form a front boundary of the rear load space and the flexible cover is configured in a partially folded configuration so as to extend from a position adjacent the further row of seating to a position adjacent the rear closure member when the rear closure member is in the closed position and, when the second and further rows of seating are both in their respective stowed positions, the flexible cover is configured in the extended configuration so as to extend from the position adjacent the front row of seating to the position adjacent the rear closure member when the rear closure member is in the closed position. When not required for use in concealing items located in the load space, the flexible cover may be one of rolled up and folded for stowage in a convenient location in the motor vehicle.

The flexible cover may be made from stretchable material. At least when the flexible cover is in use as a load space cover, the flexible cover may be attached to the motor vehicle so as to be held taut. At least when the flexible cover is in use as a load space cover, the flexible cover may be attached to the motor vehicle so as to be held in a state of extension.

The flexible cover may be made from a first layer of tough resilient material and a second layer of soft material secured together to form the flexible cover. The transversely extending stiffeners may be interposed between the first and second layers forming the flexible cover. The transversely extending stiffeners may comprise a combination of magnetic and ferromagnetic strips. Each magnetic strip may comprise of one of a flexible magnetic strip and an elongate stiffener having a flexible magnetic strip adhesively bonded thereto and each ferromagnetic strip comprises one of an elongate stiffener having a thin ferromagnetic strip adhesively bonded thereto and a thin steel strip.

According to a second embodiment, there is provided a multi-functional flexible cover for attachment to a motor vehicle having a rear load space accessible via a rear closure member, wherein the flexible cover comprises a substantially rectangular flexible sheet of material having a number of transversely extending elongate stiffeners forming natural fold lines to aid folding of the flexible cover and the flexible cover is configurable in a number of configurations including at least a first configuration in which the flexible cover is folded back upon itself to form a small first load space cover for a rear load space of the motor vehicle and a second configuration in which the flexible cover is extended to form a large second rear load space cover for the motor vehicle.

The flexible cover may be made from a stretchable material. The flexible cover may be made from a first layer of tough resilient material and a second layer of soft material secured together to form the flexible cover. The tough resilient material and the soft material may be secured together by one of sewing and adhesive bonding.

The transversely extending stiffeners may be interposed between the first and second layers forming the flexible cover. The transversely extending stiffeners may comprise a combination of magnetic and ferromagnetic strips. Each magnetic strip may comprise of one of a flexible magnetic strip and an elongate stiffener having a flexible magnetic strip adhesively bonded thereto and each ferromagnetic strip may comprise one of an elongate stiffener having a thin ferromagnetic strip adhesively bonded thereto and a thin steel strip.

The flexible cover may be further configurable as a cover for a floor of the rear load space. The flexible cover may be further configurable so as to lie above the rear cargo space of the motor vehicle as a small item carrier by positioning stiffeners to produce slack in the flexible cover which sags to form a shallow valley in which small items are transportable. The flexible cover may be further configurable as an extendible weather protector by attaching one end of the flexible cover near a free edge of a hatch of the motor vehicle when the hatch is in an open position and attaching a distal end of the flexible cover to a pair of extendible poles that hold the flexible cover taut. The flexible cover may be further configurable as a vehicle roof protector by placing the flexible member so as to lie upon a roof of the motor vehicle and using the magnetic strips to hold the flexible cover in place by magnetic attraction between the roof and the magnetic strips.

Such a flexible cover has a number of advantages including its versatility and multiple uses, lightweight and low cost due to its flexible material/fabric construction; easy stowage due to the ability to easily roll the flexible cover into a manageable roll.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A motor vehicle comprising:
   a passenger compartment;
   first and second rows of seating mounted in the passenger compartment, the second row of seating being mounted to the rear of the first row of seating and being movable between a normal passenger seating position in which the second row of seating forms a front boundary of a rear load space of the motor vehicle and a stowed position in which the second row of seating is folded and the first row of seating forms the front boundary of the rear load space;
   a hinged rear closure member to provide access to the rear load space, a rear boundary of the rear load space being formed at least partially by the rear closure member when the rear closure member is in a closed position; and
   a substantially rectangular flexible sheet forming a flexible cover configurable to conceal items located in the load space from view and having a plurality of transversely extending elongate stiffeners forming natural fold lines to aid folding of the flexible cover, wherein when the second row of seating is in the stowed position, the flexible cover is configured in an extended configuration so as to extend from a position adjacent the front row of seating to a position adjacent the rear closure member when the rear closure member is in the closed position and, when the second row of seating is in the normal passenger seating position, the flexible cover is configured in a folded configuration in which the flexible cover is folded back onto itself and the flexible cover extends from a position adjacent the second row of seating to a position adjacent the rear closure member when the rear closure member is in the closed position, wherein the motor vehicle has three rows of seating and the first row of seating is a middle row of seating and the second row of seating is a rear row of seating.

2. The vehicle as claimed in claim 1, wherein the first row of seating is a front row of seating, the second row of seating is a rear row of seating and there is a further row of seating located between the first and second rows of seating, the further row of seating having normal passenger seating and stowed positions and when the second row of seating is in the stowed position and the further row of seating is in the normal passenger seating position, the further row of seating forms a front boundary of the rear load space and the flexible cover is configured in a partially folded configuration so as to extend from a position adjacent the further row of seating to a position adjacent the rear closure member when the rear closure member is in the closed position and, when the second and further rows of seating are both in their respective stowed positions, the flexible cover is configured in the extended configuration so as to extend from the position adjacent the front row of seating to the position adjacent the rear closure member when the rear closure member is in the closed position.

3. The vehicle as claimed in claim 1, wherein when not required for use in concealing items located in the load space, the flexible cover is one of rolled up and folded for stowage in a convenient location in the motor vehicle.

4. The vehicle as claimed in claim 1, wherein the flexible cover is made from stretchable material, wherein at least when the flexible cover is in use as a load space cover, the flexible cover is attached to the motor vehicle so as to be held in a state of extension.

5. The vehicle as claimed in claim 1, wherein at least when the flexible cover is in use as a load space cover, the flexible cover is attached to the motor vehicle so as to be held taut.

6. The motor vehicle as claimed in claim 1, wherein the flexible cover is made from a first layer of tough resilient material and a second layer of soft material secured together to form the flexible cover, wherein the transversely extending stiffeners are interposed between the first and second layers forming the flexible cover.

7. The motor vehicle as claimed in claim 1, wherein the transversely extending stiffeners comprise a combination of magnetic and ferromagnetic strips, wherein each magnetic strip comprises of one of a flexible magnetic strip and an elongate stiffener having a flexible magnetic strip adhesively bonded thereto and each ferromagnetic strip comprises one of an elongate stiffener having a thin ferromagnetic strip adhesively bonded thereto and a thin steel strip.

8. A multi-functional flexible cover for attachment to a motor vehicle having a rear load space accessible via a rear closure member wherein the flexible cover comprises a substantially rectangular flexible sheet of material having a plurality of transversely extending elongate stiffeners forming natural fold lines to aid folding of the flexible cover, wherein the flexible cover is configurable in a number of configurations including at least a first configuration in which the flexible cover is folded back upon itself to form a small load space cover for a rear load space of the motor vehicle and a second configuration in which the flexible cover is extended to form a large rear load space cover for the motor vehicle, wherein the flexible cover is made from a first layer of tough resilient material and a second layer of soft material secured together to form the flexible cover, and wherein the tough resilient material and the soft material are secured together by one of sewing and adhesive bonding.

9. The cover as claimed in claim 8, wherein the flexible cover is made from a stretchable material.

10. The cover as claimed in claim 8, wherein the transversely extending stiffeners are interposed between the first and second layers forming the flexible cover.

11. A multi-functional flexible cover for attachment to a motor vehicle having a rear load space accessible via a rear closure member wherein the flexible cover comprises a substantially rectangular flexible sheet of material having a plurality of transversely extending elongate stiffeners forming natural fold lines to aid folding of the flexible cover, wherein the flexible cover is configurable in a number of configurations including at least a first configuration in which the flexible cover is folded back upon itself to form a small load space cover for a rear load space of the motor vehicle and a second configuration in which the flexible cover is extended to form a large rear load space cover for the motor vehicle, wherein the transversely extending stiffeners comprise a combination of magnetic and ferromagnetic strips, and wherein each magnetic strip comprises one of a flexible magnetic strip and an elongate stiffener having a flexible magnetic strip adhesively bonded thereto and each ferromagnetic strip comprises one of an elongate stiffener having a thin ferromagnetic strip adhesively bonded thereto and a thin steel strip.

12. A multi-functional flexible cover for attachment to a motor vehicle having a rear load space accessible via a rear closure member wherein the flexible cover comprises a substantially rectangular flexible sheet of material having a plurality of transversely extending elongate stiffeners forming natural fold lines to aid folding of the flexible cover, wherein the flexible cover is configurable in a number of configurations including at least a first configuration in which the flexible cover is folded back upon itself to form a small load space cover for a rear load space of the motor vehicle and a second configuration in which the flexible cover is extended to form a large rear load space cover for the motor vehicle, wherein the flexible cover is further configurable as a cover for a floor of the rear load space, or is further configurable so as to lie above the rear cargo space of the motor vehicle as a small item carrier by positioning stiffeners to produce slack in the flexible cover which sags to form a shallow valley in which small items are transportable, or is further configurable as an extendible weather protector by attaching one end of the flexible cover near a free edge of a hatch of the motor vehicle when the hatch is in an open position and attaching a distal end of the flexible cover to a pair of extendible poles that hold the flexible cover taut.

13. The cover as claimed in claim 11, wherein the flexible cover is further configurable as a vehicle roof protector by placing the flexible member so as to lie upon a roof of the motor vehicle and using the magnetic strips to hold the flexible cover in place by magnetic attraction between the roof and the magnetic strips.

* * * * *